United States Patent
Al-Mehthel et al.

(10) Patent No.: US 10,538,383 B2
(45) Date of Patent: Jan. 21, 2020

(54) PROTECTION SYSTEM FOR SULFUR STORAGE APPARATUS

(75) Inventors: Mohammed Al-Mehthel, Dhahran (SA); Saleh Al-Idi, Khobar (SA); Mohammed Maslehuddin, Dhahran (SA); Mohammed Shameem, Dhahran (SA); Mohammed Ibrahim, Dhahran (SA)

(73) Assignees: SAUDI ARABIAN OIL COMPANY, Dhahran (SA); KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 956 days.

(21) Appl. No.: 13/029,877

(22) Filed: Feb. 17, 2011

(65) Prior Publication Data
US 2012/0211391 A1   Aug. 23, 2012

(51) Int. Cl.
*B65D 85/84* (2006.01)
*B65D 90/02* (2019.01)

(52) U.S. Cl.
CPC .................................. *B65D 90/022* (2013.01)

(58) Field of Classification Search
USPC .............................. 206/524.1; 53/401; 122/5
See application file for complete search history.

(56) References Cited

U.S. PATENT DOCUMENTS

| | | | |
|---|---|---|---|
| 3,503,381 A | 3/1970 | Role | |
| 3,896,963 A | 7/1975 | Schisler | |
| 4,155,967 A * | 5/1979 | South | E04B 1/169 249/65 |
| 4,662,669 A | 5/1987 | Erickson et al. | |
| 4,753,053 A * | 6/1988 | Heard | F27D 1/141 110/336 |
| 4,816,225 A * | 3/1989 | Mathur et al. | 422/262 |
| 5,094,044 A * | 3/1992 | Dykmans | 52/80.1 |
| 5,261,764 A | 11/1993 | Walles | |
| 5,290,407 A * | 3/1994 | Syrett et al. | 205/729 |
| 5,603,759 A | 2/1997 | Burkhart | |

(Continued)

FOREIGN PATENT DOCUMENTS

| | | | |
|---|---|---|---|
| AU | 780760 | | 4/2005 |
| CA | 2052109 | * | 4/1992 |

(Continued)

OTHER PUBLICATIONS

SewperCoat, Material Safety Data Sheet, www.kerneosinc.com/sewpercoat.php, Aug. 24, 2006, pp. 1-5, Chesapeake, VA.

(Continued)

*Primary Examiner* — Steven B McAllister
*Assistant Examiner* — John E Bargero
(74) *Attorney, Agent, or Firm* — Bracewell LLP; Constance G. Rhebergen; Linda L. Morgan

(57) ABSTRACT

A calcium aluminate cement protective coating is resistant to sulfuric acid and can be used as a lining to protect surfaces in sulfur storage vessels and sulfuric acid storage vessels. The protective coating can include calcium aluminate cement, calcium aluminate based synthetic aggregates, and water. The protective coating is resistant to sulfur and sulfuric acid attack, and thus can be used to protect surfaces inside sulfur storage pits, sulfur storage tanks, and sulfuric acid storage containers.

23 Claims, 4 Drawing Sheets

(56) References Cited

U.S. PATENT DOCUMENTS

| | | | |
|---|---|---|---|
| 5,753,572 A | 5/1998 | Langenohl | |
| 5,955,162 A | 9/1999 | Loving | |
| 5,972,102 A * | 10/1999 | Vezza | C04B 28/06 |
| | | | 106/692 |
| 6,006,944 A * | 12/1999 | Machledt | B65D 88/76 |
| | | | 137/493.8 |
| 6,960,253 B2 | 11/2005 | Radtke, Jr. | |
| 2004/0025752 A1* | 2/2004 | Sugama | C04B 28/34 |
| | | | 106/692 |
| 2007/0221099 A1* | 9/2007 | Mintz et al. | 106/692 |
| 2008/0175990 A1* | 7/2008 | McGowan et al. | 427/181 |

FOREIGN PATENT DOCUMENTS

| | | | |
|---|---|---|---|
| DE | 3414914 | | 10/1984 |
| JP | 2005047771 | | 2/2005 |
| JP | 2006124202 | | 5/2006 |
| JP | 2007001803 | | 1/2007 |
| JP | 2007145640 | * | 6/2007 |
| JP | 4021554 | | 12/2007 |
| JP | 2009234893 | | 10/2009 |
| WO | 2005000767 | | 1/2005 |

OTHER PUBLICATIONS

Flow-Liner CAM, www.enviro-flow.com/pdf/flow-liner-cam.pdf, Nov. 12, 2008.
Joseph Talley and Greg Wallace, Calcium Aluminate Technology and Biogenic Corrosion, www.ttmag.com/index/webapp-stories-action/id=836, Jun. 1, 2009.
Sulfuric Acid / Sulfur Storage Tank Inspections, AIChE Central Florida Annual Convention, Jun. 12, 2009.
Hornbaker, David & Kobylarz, Peter, Thermal Maintenance of Field Erected Sulphur Tanks, Nov. 21, 2006, pp. 1-18.
Sulphur Systems—Sulphur Storage, DKL Engineering, Inc., Nov. 4, 2003.
Clark, Peter D., et al, Preventing Corrosion in Sulfur Storage Tanks, Sep. 4, 2008, pp. 1-20.
PCT International Search Report dated May 11, 2012; International Application No. PCT/US2012/025596; International Filing Date: Feb. 17, 2012.

* cited by examiner

PROTECTION SYSTEM FOR SULFUR STORAGE APPARATUS

BACKGROUND OF THE INVENTION

Technical Field of the Invention

This invention generally relates to the field of protective coatings for fluid storage vessels. In particular, the present invention is directed to a protective coating for the surfaces of a storage container to protect the container against molten sulfur and sulfuric acid.

Description of the Related Art

Severe deterioration of concrete, which is caused by the conversion of oxides of sulfur to sulfuric acid in the presence of moisture, has been noticed in the sulfur pits, sulfur tanks and sulfuric acid containers in petroleum refineries, and gas plants particularly in those where the groundwater table is very shallow. The high temperature of the molten sulfur and the formation of sulfuric acid in the presence of moisture lead to cracking and spalling of concrete. The repair of cracks by epoxy injection is not feasible because of the elevated temperature of the walls of the sulfur pits/tanks. Similarly, the commonly available protective coatings do not withstand the exposure conditions in the sulfur pits. The deteriorated concrete is generally prepared with ordinary Portland cement concrete or silica fume cement concrete. However, these two materials exhibit deterioration within a short period of time.

There is a growing concern regarding the emission of $H_2S$ gas and the related health and environmental hazards in the plants. From the environmental and structural perspectives, there is a need to develop a protection system for concrete against the aggressive sulfur and/or acid attack.

SUMMARY OF THE INVENTION

A protective lining that can be used to protect surfaces inside chemical storage vessels, including sulfur pits, sulfur tanks, and sulfuric acid containers. One embodiment includes a sulfur storage apparatus that has a vessel having sidewalls and a top cover, and a lining attached to the sidewalls and the top cover. The lining can be resistant to molten sulfur and sulfuric acid. The materials of the lining can include calcium aluminate cement, calcium aluminate-based synthetic aggregate, the calcium aluminate based synthetic aggregate being hard dense heat resistant aggregates, and water. The system can also include a heater connected to the vessel, a pump connected to the vessel, and an anchorage system on the surface of the lining In one embodiment, the lining materials include about 18.5% calcium aluminate cement, about 74% calcium aluminate based synthetic aggregate, and about 7.5% water. In one embodiment, the vessel can be a sulfur storage pit, located below ground level, and the sidewalls are concrete. In another embodiment, the vessel can be a sulfur storage tank wherein the sidewalls have a generally cylindrical shape and comprise metal. In one embodiment, sulfur gas contacts the lining on the top cover. In one embodiment, the thickness of the lining is between about 10 millimeters and 20 millimeters. In one embodiment, a weight of the lining is reduced by less than about 6% when exposed to 5% sulfuric acid for more than 9 months. In one embodiment, lining retains at least 65% of its initial compressive strength after being exposed to 5% sulfuric acid for 9 months. In one embodiment, the lining can be applied by a variety of techniques, including casting, spraying, gunning, ramming, troweling, or shotcrete.

In one embodiment, a method for storing a fluid can include the steps of providing a storage vessel, the vessel having sidewalls and a top cover; creating an anchorage system on the sidewalls and top cover; lining the sidewalls and on the top cover with a lining, the lining engaging the anchorage system and being resistant to molten sulfur and sulfuric acid and being made of materials including: calcium aluminate cement, calcium aluminate-based synthetic aggregate, the calcium aluminate based synthetic aggregate being hard dense heat resistant aggregates, and water; connecting a heater to the vessel; and connecting a pump to the vessel.

In one embodiment of the method, the material of the lining can include about 18.5% calcium aluminate cement, about 74% calcium aluminate based synthetic aggregate, and about 7.5% water. In one embodiment of the method, the sidewalls and top cover can include concrete, and the step of creating an anchorage system can include creating a rough surface on the sidewalls and the top cover. In one embodiment of the method, the step of creating an anchorage system can include connecting an anchor fixture to the sidewalls. In one embodiment, the lining can be between about 10 millimeters and 20 millimeters. One embodiment of the method includes the step of exposing at least a portion of the lining to gas having at least 5% sulfur gas and exposing at least another portion of the lining to molten sulfur. In one embodiment, weight of the lining is reduced by less than about 6% after 9 months of being exposed to 5% sulfur gas. In one embodiment, the step of lining the sidewalls can include a variety of methods, such as casting, spraying, gunning, ramming, troweling, or shotcrete.

In one embodiment, a method for storing molten sulfur can include providing a storage vessel, the vessel having sidewalls and a top cover; creating an anchorage system on the sidewalls and top cover; lining the sidewalls and on the top cover with a lining, the lining engaging the anchorage system and being resistant to molten sulfur and sulfuric acid and made of a material that includes: calcium aluminate cement, calcium aluminate-based synthetic aggregate, the calcium aluminate based synthetic aggregate being hard dense heat resistant aggregates, and water; connecting a heater to the vessel; connecting a pump to the vessel; filling the vessel with molten sulfur; heating the molten sulfur with the heater; preventing sulfur gas from contacting the top cover; and preventing sulfuric acid from contacting the sidewalls. In one embodiment, the vessel can be a below-ground sulfur pit, an above-ground sulfur tank, or a sulfuric acid container.

DETAILED DESCRIPTION OF THE INVENTION

The present invention will now be described more fully hereinafter with reference to the accompanying drawing which illustrates embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
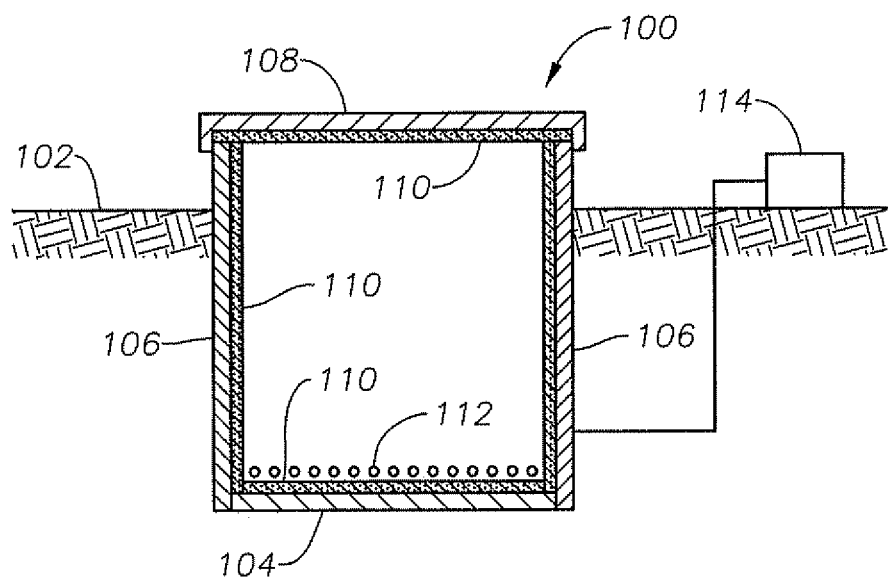
FIG. 1 is a section view of an exemplary embodiment of a sulfur storage pit having a protective lining.

Referring to FIG. 1, sulfur storage pit 100 is a sulfur storage vessel that can be used to store molten sulfur. In one embodiment, the majority of sulfur storage pit 100 is below grade, meaning that most of the pit is below ground 102 level. The bottom of pit 100 can include a base slab 104. Side walls 106 can rise up from base slab 104 to form the sides of the vessel. In one embodiment, side walls 106 and base slab 104 can be made of reinforced concrete. Alternatively, side wall 106 and base slab 104 can be made of, for example, steel or bricks. Furthermore, sidewalls 106 need not be homogenous—for example, part of the sidewall can be reinforced concrete and part of the sidewall can be brick. Joints between base slab 104 and side walls 106, and joints between individual segments of side walls 106, can be sealed by, for example, a heat resistant epoxy. Roof slab 108 can be a top cover to enclose sulfur storage pit 100. Roof slab 108 can be made of any of a variety of materials including, for example, reinforced concrete or carbon steel. Sulfuric acid resistant coating 110 can be used as a lining to protect any or all of base slab 104, side walls 106, and roof slab 108. As will be described in more detail, below, sulfuric acid resistant coating 110 can be a protective coating that can include a calcium aluminate cement and can have calcium aluminate-based synthetic aggregate.

Heater 112 can be used to heat molten sulfur inside sulfur storage pit 100. Heater 112 can be, for example, electric coils or steam tubing. In one embodiment, heater 112 can be coils of heating elements located inside pit 100, as shown in FIG. 1. Alternatively, the coils can be embedded or partially embedded in base slab 104 or side walls 106. In one embodiment, no heater is used with pit 100. A pump 114 can be used to pump sulfur into or out of pit 100. Components such as heater 112, pump 114, and various tubing and cables that are exposed to sulfur and sulfuric acid can also be coated with sulfuric acid resistant coating 110.

Figure 2:
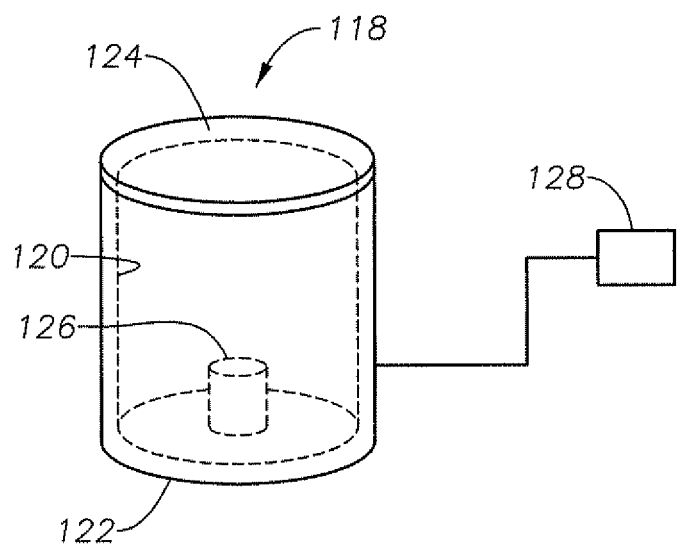
FIG. 2 is a sectional orthogonal view of an exemplary embodiment of a sulfur storage tank having a protective lining.

Referring to FIG. 2, sulfur storage tank 118 is another embodiment of a sulfur storage vessel. Tank 118 can have a generally cylindrical shape, wherein the cylinder defines sidewalls 120, or it can have other shapes. Tank 118 can have a bottom 122 and a top cover 124. Sidewalls 120, bottom 122, and top cover 124 can be made of a variety of materials including, for example, steel, carbon steel, or cement. Furthermore, sidewalls 120, bottom 122, and top cover 124 need not be made of the same material. In one embodiment, sidewalls 120 are formed of individual segments, or plates, that are joined together by, for example, welding. Like storage pit 100, tank 118 can have heater 126 and pump 128. In the embodiment shown in FIG. 2, heater 126 is a cylindrical immersion heater that can have heating elements and can be placed inside tank 118. Other types of heater can be used or the storage vessel can have no heater at all. Sulfuric acid resistant coating 110 can be used to protect any surface inside tank 118, including the interior surfaces of the sidewalls 120, bottom 122, and top cover 124.

Figure 3:
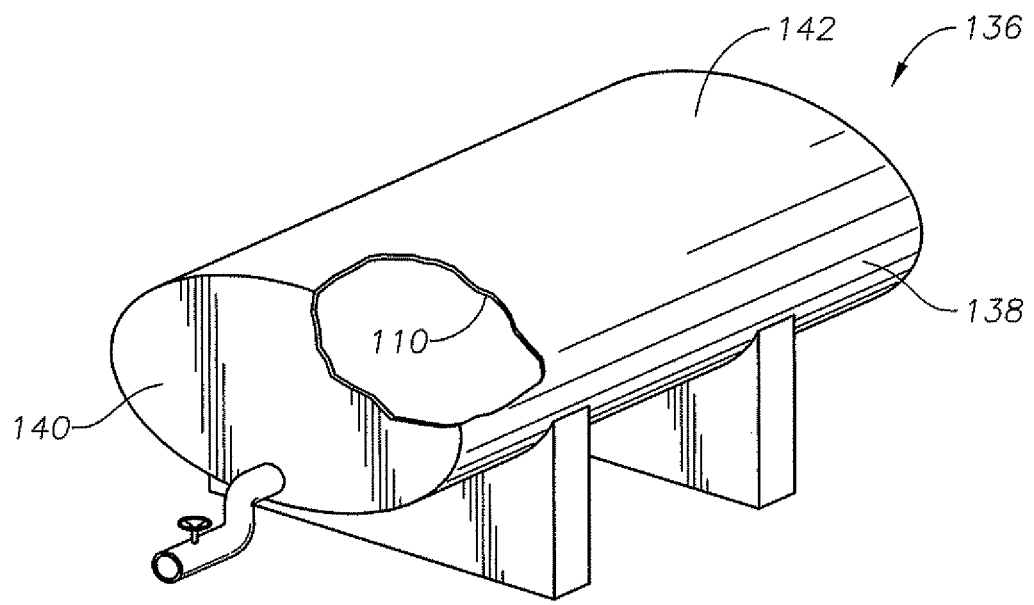
FIG. 3 is a cut-away orthogonal view of an exemplary embodiment of a sulfuric acid storage tank having a protective lining.

Referring to FIG. 3, sulfuric acid container 136 can be used to store sulfuric acid. Sulfuric acid container 136 can be, for example, an above-ground tank, or any other type of vessel used to store sulfuric acid. In the exemplary embodiment shown in FIG. 3, the container 136 has an elliptical cross section and the sides 138 of the ellipse and ends 140 define the sidewalls of the container. The top portion 142 of the ellipse can define the top cover of the container. Container 136 can have other shapes including, for example, rectangular, cylindrical or spherical. Sulfuric acid resistant coating 110 can cover the interior surfaces of the sides 138, ends 140, and top portion 142.

Referring to FIGS. 1-3, sulfuric acid resistant coating 110 can include calcium aluminate cement, calcium aluminate-based synthetic aggregate, and water. Sulfuric acid resistant coating can be resistant to chemical degradation from molten sulfur and sulfuric acid, and can withstand temperatures in excess of 300 degrees Fahrenheit. The calcium aluminate based synthetic aggregate can be a hard dense heat resistant aggregate. In one embodiment, the mix proportions of sulfuric acid resistant coating 110 can be about 10-97% calcium aluminate cement, about 0-87% calcium aluminate-based synthetic aggregates, and about 3-15% water. In one embodiment, the mix proportions of sulfuric acid resistant coating 110 can be about 12-30% calcium aluminate cement, about 50-80% calcium aluminate-based synthetic aggregates, and about 5-12% water. In one embodiment, the mix proportions of sulfuric acid resistant coating 110 can be about 18.5% calcium aluminate cement, about 74% calcium aluminate-based synthetic aggregates, and about 7.5% water. In one embodiment, the mix proportions can be about 17-19% calcium aluminate cement, about 70-75% calcium aluminate-based synthetic aggregates, and about 7-8% water. In one embodiment, the cement can include about 5-10% sand. The sand can be sand that passes through a sieve having a 3/16 inch opening.

The calcium aluminate cement can include hydraulic calcium aluminates. In one embodiment, the active component of calcium aluminate cement can be monocalcium aluminate ($CaAl_2O_4$). It can also include other calcium aluminates, as well as less reactive components (which can include impurities). The calcium aluminate-based synthetic aggregates can include alumina, calcium, silica, and ferric oxide. In one embodiment, the alumina ($Al_2O_3$) can be in the range of about 35% to about 58%.

Figure 4:
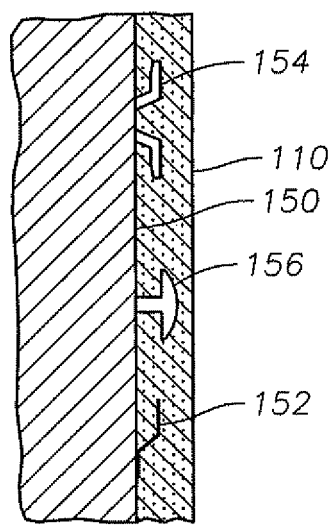
FIG. 4 is a sectional side view of a sidewall with an exemplary embodiment of the lining of the present invention.

Referring to FIG. 4, sulfuric acid resistant coating 110 can be applied to surface 150 of the interior of a sulfuric or sulfuric acid storage apparatus. The cementious properties of sulfuric acid resistant coating 110 can cause it to adhere directly to surface 150, regardless of the type of material of surface 150. Lining may adhere better to some materials, such as Portland cement-based concrete. Sulfuric acid resistant coating 110 may have less adhesion to other materials, such as polished steel, but can still adhere to such materials.

In one embodiment, an anchorage device can be used with surface 150 and sulfuric acid resistant coating 110 to promote adhesion. For example, strap 152, cleat 154, or stud 156 can be installed on surface 150 before sulfuric acid resistant coating 110 is applied. A variety of techniques can be used to connect these anchorage devices to surface 150. For example, mechanical fasteners, such as screws or pins, can pass through strap 152 or cleat 154 and into surface 150. The anchorage device itself can be driven into surface 150, as shown with stud 156. If surface 150 is a metal surface, such as steel, then the anchorage device can be welded to the surface. If surface 150 is concrete, the anchorage devices can be embedded in the concrete before the concrete cures.

Figure 5:
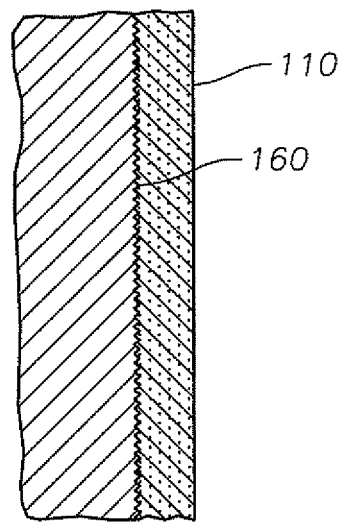
FIG. 5 is a sectional side view of another sidewall with exemplary embodiment of the lining of the present invention.

Referring to FIG. 5, a rough surface can be created on surface 160 to establish greater adhesion between sulfuric acid resistant coating 110 and surface 160. For example, surface 160 can be mechanically or chemically abraided to create a rough texture. If surface 160 is concrete, a mold having a rough texture can be used while the concrete is curing, or a tool, such as a brush, can create a texture on the surface before the concrete is completely cured. Surface 160 can be cleaned, such as by an acid wash, prior to applying sulfuric acid resistant coating 110 to promote greater adhesion between the surface and the lining.

Sulfuric acid resistant coating 110 can be applied to surface 160 in a liquid state and then allowed to cure. The coating can adhere to surface 160 as it cures. In embodiments using anchorage systems, such as the mechanical and surface anchorage systems shown in FIGS. 4 and 5, the sulfuric acid resistant coating 110 can flow around and into the anchorage system. As the lining cures, the anchorage system provides additional adhesion between surface 160 and sulfuric acid resistant coating 110.

Figure 6A:
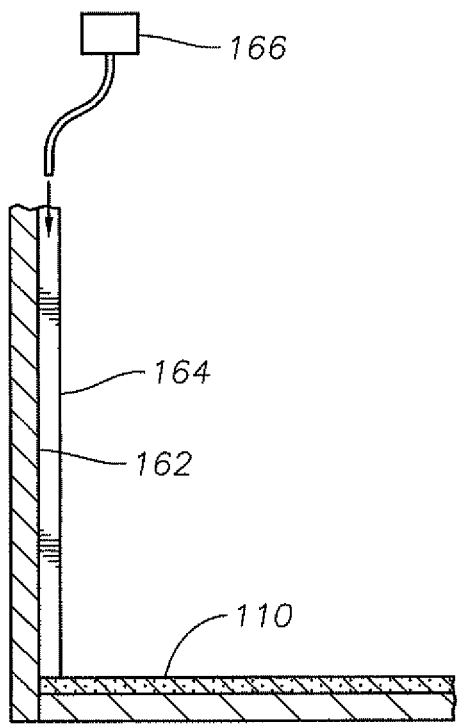
FIGS. 6a-6c are diagrammatic views of exemplary embodiments of the application of the lining of the present invention.
Figure 6B:
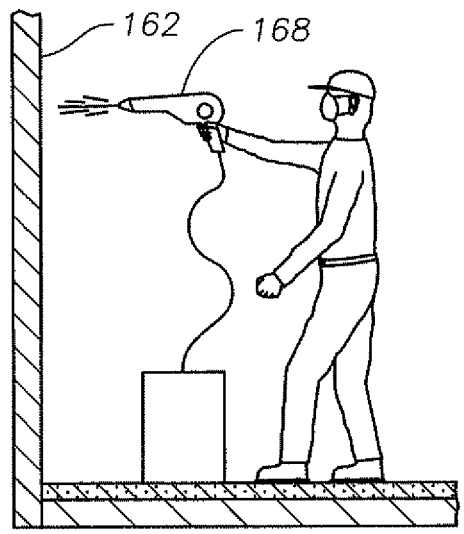
Figure 6C:
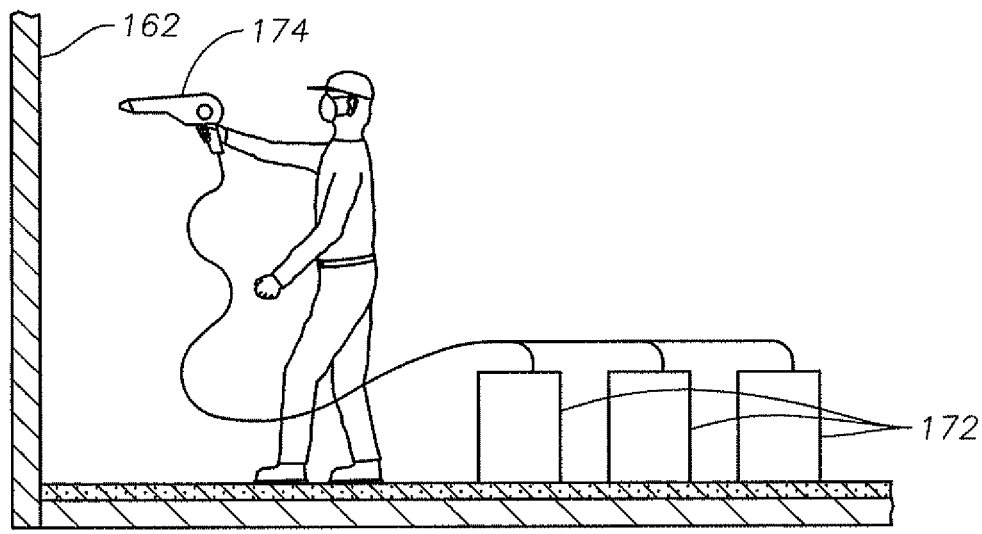

Referring to FIG. 6, sulfuric acid resistant coating 110 can be applied by any technique suitable for applying concrete to a surface 162. For example, it can be applied by casting, wherein form boards 164 are assembled adjacent to surface 162 and sulfuric acid resistant coating 110, in its uncured liquid state 166 is poured between the form board 164 and the surface 162 (FIG. 6*a*). Sulfuric acid resistant coating 110 can be applied by spraying or gunning, wherein a spray gun 168 sprays the lining, in its uncured liquid state, onto surface 162 (FIG. 6*b*). Sulfuric acid resistant coating 110 can also be applied by troweling, wherein a tool, such as a trowel 170. Another application technique is shotcrete, wherein wet or dry sulfuric acid resistant coating 110 components 172 are mixed as they are sprayed onto surface 110 with a shotcrete spray gun 174 (FIG. 6*c*). Finally, sulfuric acid resistant coating 110 can be applied to surface 162 by ramming (not shown).

Sulfuric acid resistant coating 110 can be any thickness. In one embodiment, sulfuric acid resistant coating 110 can be between about 10 mm and about 20 mm thick. In one embodiment, sulfuric acid resistant coating 110 has an irregular thickness, wherein the thicknesses of a single sulfuric acid resistant coating 110 vary from one place to another. For example, if the underlying surface 162 is irregular or damaged, sulfuric acid resistant coating 110 can be used to fill in the damaged area. In this case, it is thicker in the area of the damage.

Figure 7:
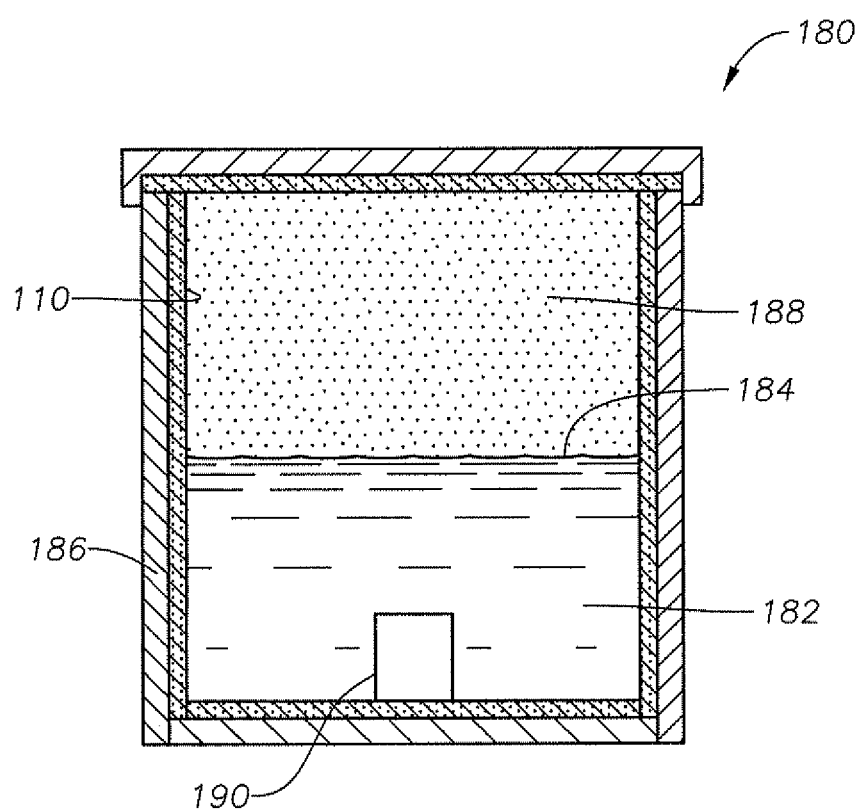
FIG. 7 is a section side view of a sulfur storage tank having an exemplary embodiment of the present invention.

Referring to FIG. 7, sulfur storage apparatus 180 contains molten sulfur 182. During typical operations, the fluid level of the molten sulfur 182 is centered around fluid level 184 on sidewall 186. The fluid level can vary up and down. Vapor space 188 is the space above the fluid level. Because the heater 190 is located in the molten sulfur 182, heat is not readily transferred to the top cover 192 and the portion of the sidewalls above fluid level 184. Sulfur vapor can, thus, condense in these areas. Furthermore, sulfuric acid can be formed inside sulfur storage apparatus 180. Indeed, if water vapor is present inside the apparatus, it can react with the molten sulfur to create a sulfuric acid vapor. The sulfuric acid vapor can rise into vapor space 188 and corrode the sidewalls 186 and top cover 192. The sulfuric acid vapor may contact the sulfuric acid resistant coating on the surfaces of sidewall 186 and top cover 192, but the sulfuric acid resistant coating 110 prevents the sulfuric acid vapor from contacting the underlying surface. The areas of sidewall 186 and top cover 192 can have thicker sulfuric acid resistant coating 110. In some embodiments, such as in sulfur storage pits, the areas of sidewall 186 around fluid level 184 can be made of brick. This area, where the fluid level fluctuates, can have significant damage resulting from the interaction between moist atmospheric air and sulfur at the interface. In one embodiment, the sulfuric acid resistant coating 110 is thicker at the sidewall area around fluid level 184 to provide greater protection from damage. In embodiments wherein the sulfur storage apparatus uses brick as a portion of the sidewall 186 (not shown), the sulfuric acid resistant coating 110 can be applied to the brick.

During an experiment, an exemplary embodiment of sulfuric acid resistant coating 110, made of calcium aluminate cement, calcium aluminate-based synthetic aggregates, and water, was exposed to 5% sulfuric acid for an extended period of time. The sulfuric acid removed material from each of ordinary Portland cement concrete, silica fume cement concrete, and the lining material. The results, shown in Table 1, show that the sulfuric acid resistant coating 110 material resisted the acid attack better than either of the other two concrete materials. Indeed, the difference in corrosive effects were so drastic that the results were unexpected. Over a period of 9 months, the sulfuric acid resistant coating 110 material lost only 5.8% of its original weight, while the other concretes each lost at least 27% of their weights.

TABLE 1

| Material | Weight loss, % | | |
| --- | --- | --- | --- |
|  | 3 months | 6 months | 9 months |
| Ordinary portland cement concrete | 9.5 | 10.9 | 27.8 |
| Silica fume cement concrete | 9.2 | 11.5 | 29.9 |
| Calcium aluminate cement, calcium aluminate-based synthetic aggregates. | 2.1 | 2.8 | 5.8 |

In another experiment, the compressive strength of the material of sulfuric acid resistant coating 110 was measured after being exposed to 5% sulfuric acid for 3, 6, and 9 months. The unexpected results show that the sulfuric acid resistant coating 110 material lost less than 35% of its compressive strength after 9 months, while Portland cement concrete and silica fume cement concrete each lost more than 55% of their compressive strength. The results are shown in Table 2.

TABLE 2

| Material | Reduction in compressive strength, % | | |
| --- | --- | --- | --- |
|  | 3 months | 6 months | 9 months |
| Ordinary Portland cement concrete | 8.3 | 24.56 | 56.17 |
| Silica fume cement concrete | 10.7 | 21.46 | 59.45 |
| Calcium aluminate cement, calcium aluminate-based synthetic aggregates. | 8.3 | 16.28 | 33.03 |

In another experiment, the ingress of sulfates into the sulfuric acid resistant coating 110 was measured after being exposed to sulfuric acid for 20 months. As shown in Table 3, the sulfuric acid resistant coating 110 material, identified as "System 4," had the least sulfate content as a percent weight of the concrete, of any of the 10 types of concrete tested. The ten types of concrete in Table 3 are: System-1 Plain concrete; System-2 potassium silicate based acid proof concrete; System-3 Inorganic potassium base mortar; System-4 Calcium Aluminates Cement and Calcium Aluminates Based Synthetic Aggregates; System-5 Calcium Aluminates Cement and limestone aggregates; System-6 Fire bricks of cementious materials compounded with fire clay; System-7 Acid Resistant mortar; System-8 Hybrid epoxy based on reinforced polymer; System-9 Corrosion Resistant Coating; System-10 Coating.

TABLE 3

| | Sulfate content, % wt. of concrete | | | | | | | | | |
|---|---|---|---|---|---|---|---|---|---|---|
| Depth, mm | System-1 | System-2 | System-3 | System-4 | System-5 | System-6 | System-7 | System-8 | System-9 | System-10 |
| 0-5 | 1.4208 | 0.583 | 1.06 | 0.099 | 0.319 | 1.047 | 1.286 | 1.037 | 0.406 | 0.849 |
| 10-15 | 0.846 | 0.332 | 0.353 | 0.0896 | 0.123 | 0.751 | 0.458 | 0.329 | 0.32 | 0.233 |
| 25-30 | 0.535 | 0.212 | 0.147 | 0.0848 | 0.109 | 0.425 | 0.286 | 0.2 | 0.224 | 0.109 |
| 50-55 | 0.238 | 0.128 | 0.123 | 0.085 | 0.104 | 0.176 | 0.175 | 0.118 | 0.164 | 0.09 |
| 95-100 | 0.114 | 0.128 | 0.099 | 0.0753 | 0.099 | 0.104 | 0.133 | 0.089 | 0.128 | 0.08 |

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A sulfur storage apparatus operable to store molten sulfur comprising:
    a vessel having a sidewall and a top cover, each having an interior surface in an interior of the sulfur storage apparatus;
    a sulfuric acid resistant coating that adheres directly to the interior surface of both the sidewall and the top cover of the vessel, and comprises a material that is resistant to molten sulfur and sulfuric acid vapor that consists essentially of:
        a calcium aluminate cement in an amount of 12-30% by weight of the total sulfuric acid resistant coating, the calcium aluminate cement including 5-10% filler sized to pass through a sieve having a 3/16 inch opening,
        a calcium aluminate-based synthetic aggregate, the calcium aluminate based synthetic aggregate being a hard dense heat resistant aggregate consisting of alumina, calcium, silica, and ferric oxide and including the alumina in the range of about 35% to about 58% by weight of calcium aluminate-based synthetic aggregate, and
        water in an amount of about 7.5% by weight of the total sulfuric acid resistant coating;
    a heater connected to the vessel;
    a pump connected to the vessel; and
    an anchorage system installed on, and anchored to, each of the interior surface of both the sidewall and the top cover that is operable to promote adhesion of the sulfuric acid resistant coating to each of the interior surfaces in a direction normal to each of the interior surfaces such that none of the interior surface is exposed to the molten sulfur and the sulfuric acid vapor.

2. The sulfur storage container of claim 1, wherein the sulfuric acid resistant coating consists of 18.5% calcium aluminate cement, 74% calcium aluminate based synthetic aggregate, and 7.5% water, each by weight of the total sulfuric acid resistant coating.

3. The sulfur storage container of claim 1, wherein the vessel is a sulfur storage pit located below ground level, and the sidewall comprise concrete.

4. The sulfur storage container of claim 1, wherein the vessel is a sulfur storage tank, and the sidewall has a generally cylindrical shape and comprises metal.

5. The sulfur storage container of claim 1, wherein a sulfuric acid vapor contacts the sulfuric acid resistant coating adhered directly to the top cover.

6. The sulfur storage container of claim 1, wherein the sulfuric acid resistant coating has a thickness between about 10 millimeters and 20 millimeters.

7. The sulfur storage container of claim 1, wherein a weight of the sulfuric acid resistant coating is reduced by less than about 6% when exposed to 5% sulfuric acid for more than 9 months.

8. The sulfur storage container of claim 1, wherein the sulfuric acid resistant coating retains at least 65% of its initial compressive strength after being exposed to 5% sulfuric acid for 9 months.

9. The sulfur storage container of claim 1, wherein the sulfuric acid resistant coating is applied by one of casting, spraying, gunning, ramming, troweling, or shotcrete.

10. A method for storing a fluid, the method comprising:
    providing a storage vessel, the vessel having a sidewall and a top cover each with an interior surface;
    creating an anchorage system installed on, and anchored to, the interior surface of each of the sidewall and the top cover;
    lining directly the interior surface of each of the sidewall and the top cover with a sulfuric acid resistant coating, where the sulfuric acid resistant coating engages the anchorage system, wherein the anchorage system is operable to promote adhesion of the sulfuric acid resistant coating to each of the interior surfaces in a direction normal to each of the interior surfaces, and wherein the lining comprises a material that is resistant to molten sulfur and sulfuric acid vapor and consists essentially of:
a calcium aluminate cement in an amount of 12-30% by weight of the total sulfuric acid resistant coating, the calcium aluminate cement including 5-10% filler sized to pass through a sieve having a 3/16 inch opening,
a calcium aluminate-based synthetic aggregate, the calcium aluminate based synthetic aggregate being a hard dense heat resistant aggregate consisting of alumina, calcium, silica, and ferric oxide and including the alumina in the range of about 35% to about 58% by weight of calcium aluminate-based synthetic aggregate, and
water in an amount of about 7.5% by weight of the total sulfuric acid resistant coating;
connecting a heater to the vessel; and
connecting a pump to the vessel.

11. The method of claim 10, wherein the sulfuric acid resistant coating consists of 18.5% calcium aluminate cement, 74% calcium aluminate based synthetic aggregate, and 7.5% water, each by weight of the total sulfuric acid resistant coating.

12. The method of claim 10, wherein the sidewall comprises concrete, and the step of creating an anchorage system comprises creating a rough surface on the interior surface of the sidewall.

13. The method of claim 10, wherein the step of creating an anchorage system comprises connecting an anchor device to the interior surface of the sidewall.

14. The method of claim 10, wherein the sulfuric acid resistant coating has a thickness between about 10 millimeters and 20 millimeters.

15. The method of claim 10, further comprising exposing at least a portion of the sulfuric acid resistant coating to gas comprising at least 5% sulfur and exposing at least another portion of the sulfuric acid resistant coating to molten sulfur.

16. The method of claim 10, wherein a weight of the sulfuric acid resistant coating is reduced by less than about 6% when the sulfuric acid resistant coating is exposed to 5% sulfuric acid for 9 months.

17. The method of claim 10, wherein the step of lining directly the interior surface of each of the sidewall and the top cover with the sulfuric acid resistant coating includes at least one of casting, spraying, gunning, ramming, troweling, or shotcrete.

18. A method for storing molten sulfur, the method comprising:
providing a storage vessel, the vessel having a sidewall and a top cover each with an interior surface;
creating an anchorage system installed on, and anchored to, the interior surface of each of the sidewall and top cover;
lining the interior surface of each of the sidewall and on the top cover with a sulfuric acid resistant coating, where the sulfuric acid resistant coating engages the anchorage system, is resistant to molten sulfur and sulfuric acid vapor and comprises a material consisting essentially of:
calcium aluminate cement in an amount of 12-30% by weight of the total sulfuric acid resistant coating, the calcium aluminate cement including 5-10% filler sized to pass through a sieve having a 3/16 inch opening,
calcium aluminate-based synthetic aggregate, the calcium aluminate based synthetic aggregate being a hard dense heat resistant aggregate consisting of alumina, calcium, silica, and ferric oxide and including the alumina in the range of about 35% to about 58% by weight of calcium aluminate-based synthetic aggregate, and
water in an amount of about 7.5% by weight of the total sulfuric acid resistant coating;
connecting a heater to the vessel;
connecting a pump to the vessel;
filling the vessel with molten sulfur such that molten sulfur contacts the sulfuric acid resistant coating, wherein the anchorage system is operable to promote adhesion of the sulfuric acid resistant coating to each of the interior surfaces in a direction normal to each of the interior surfaces such that none of the interior surface is exposed to the molten sulfur;
heating the molten sulfur with the heater;
preventing sulfur gas from contacting the top cover; and
preventing sulfuric acid from contacting the sidewall.

19. The method according to claim 18, wherein the vessel is one of a below-ground sulfur pit, an above-ground sulfur tank and a sulfuric acid container.

20. The method of claim 18, wherein the sulfuric acid resistant coating consists of 18.5% calcium aluminate cement, 74% calcium aluminate based synthetic aggregate, and 7.5% water, each by weight of the total sulfuric acid resistant coating.

21. The method of claim 10, wherein the step of lining directly the interior surface of each of the sidewall and the top cover with the sulfuric acid resistant coating includes lining directly the interior surface of each of the sidewall and the top cover with the sulfuric acid resistant coating in a liquid state and having 7-8% water, and then curing the sulfuric acid resistant coating.

22. The sulfur storage container of claim 1, wherein the calcium aluminate-based synthetic aggregate includes the alumina in an amount of about 58% by weight of calcium aluminate-based synthetic aggregate.

23. The sulfur storage container of claim 1, wherein the filler of the calcium aluminate cement is a coarse sand.

* * * * *